(12) United States Patent
Jun

(10) Patent No.: US 8,540,279 B2
(45) Date of Patent: Sep. 24, 2013

(54) CURTAIN AIRBAG CUSHION

(75) Inventor: Jong Hyub Jun, Yongin-si (KR)

(73) Assignee: HYUNDAI MOBIS Co., Ltd, Yongin-si, Gyeonggi-do (KR)

( * ) Notice: Subject to any disclaimer, the term of this patent is extended or adjusted under 35 U.S.C. 154(b) by 326 days.

(21) Appl. No.: 12/956,359

(22) Filed: Nov. 30, 2010

(65) Prior Publication Data

US 2012/0056409 A1 Mar. 8, 2012

(30) Foreign Application Priority Data

Sep. 3, 2010 (KR) .......................... 10-2010-0086530

(51) Int. Cl.
*B60R 21/237* (2006.01)
(52) U.S. Cl.
USPC ..................................... 280/743.1; 280/730.2

(58) Field of Classification Search
USPC .................................. 280/730.2, 743.1, 728.1
See application file for complete search history.

(56) References Cited

U.S. PATENT DOCUMENTS 7,766,376 B2 * 8/2010 Yokoyama ................. 280/730.2

FOREIGN PATENT DOCUMENTS

| JP | 2000-296751 | 10/2000 |
|----|-------------|---------|
| JP | 2004-249838 | 9/2004 |
| KR | 10-2004-0062881 | 7/2004 |
| KR | 1020070070267 A | 7/2007 |

* cited by examiner

*Primary Examiner* — Drew Brown
(74) *Attorney, Agent, or Firm* — Sherr & Jiang, PLLC

(57) ABSTRACT

Provided is a curtain airbag cushion folded such that an airbag cushion can be developed inside the vehicle.

13 Claims, 9 Drawing Sheets

CURTAIN AIRBAG CUSHION

CROSS-REFERENCE TO RELATED APPLICATIONS

The present application claims priority to Korean Patent Application Number 10-2010-0086530 filed Sep. 3, 2010, the entire contents of which application is incorporated herein for all purposes by this reference.

BACKGROUND OF THE INVENTION

1. Field of the Invention

The present invention relates to a curtain airbag cushion, and more particularly, to a curtain airbag cushion folded to be mounted in a vehicle.

2. Description of the Related Art

In general, vehicles are equipped with airbag systems, safety devices, which protect passengers, using an airbag cushion inflated by inflow gas in an accident.

The airbag systems are mounted at several places for specific objects in vehicles, and there are a driver's seat airbag system that is mounted in the steering wheel to protect the driver in the driver's seat, a passenger airbag system mounted above the glove box to protect the passenger in the passenger seat, and curtain airbag systems that are mounted at the sides of the vehicle to protect the head of the driver or passengers (hereafter, the driver or passenger is integrally called a passenger for convenience of description).

In those airbag systems, the curtain airbag systems are mounted inside the A-pillar and the C-pillar at the upper portions of the front doors and the rear doors for the passengers getting in/out of the vehicle (hereafter, the front doors and the rear doors are referred to as doors for convenience of description), long in the longitudinal direction of the vehicle.

The curtain airbag system includes an inflator generating gas and the airbag cushion that is developed the gas from the inflator to cover the glass of the door window like a curtain from the top of the door, from the inflator and positioned between the door and the passenger's head to protect the passenger's head if the vehicle is hit at the side.

The airbag cushion is folded and mounted inside the A-pillar and the C-pillar and unfolded and developed by the gas flowing thereinto from the inflator, in which the airbag cushion should be developed inward in the vehicle, not outside the vehicle, to protect the passenger's head.

Therefore, a method of folding the airbag cushion such that the airbag cushion can be developed inside the vehicle is required.

SUMMARY OF THE INVENTION

The present invention has been made in effort to provide a curtain airbag cushion folded such that an airbag cushion can be developed inside a vehicle.

The objects of the present invention are not limited to the object described above, and the other objects not stated in the above will be clearly understood by those skilled in the art from the following description.

An exemplary embodiment of the present invention provides a curtain airbag cushion that includes: a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side, and that is formed by folding one end of the second folded portion toward the first side, with the second side overlapping; and a straight portion that extends straight from the folded portion, at the other end of the airbag cushion, with the second side overlapping the folded portion.

Another exemplary embodiment of the present invention provides a curtain airbag cushion that includes: a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side, and that is formed by folding one end of the second folded portion toward the first side, with the second side overlapping; and a straight portion that extends straight from the folded portion, at the other end of the airbag cushion, with the second side overlapping the folded portion.

Yet another exemplary embodiment of the present invention provides a curtain airbag cushion that includes: a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side, and that is formed by folding one end of the second folded portion toward the first side, with the second side overlapping; a straight portion that is formed at the other end of the airbag cushion, with the second side overlapping the folded portion; and a third folded portion connecting the folded portion with the straight portion, with the second side overlapping.

Still another exemplary embodiment of the present invention provides a curtain airbag cushion that includes: a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side, and that is formed by folding one end of the second folded portion toward the first side, with the second side overlapping; a straight portion that is formed at the other end of the airbag cushion, with the second side overlapping the folded portion; and an extender connecting the folded portion with the straight portion, with the second side overlapping the folded portion.

Still yet another exemplary embodiment of the present invention provides a curtain airbag cushion that includes: a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side, and that is formed by folding one end of the second folded portion toward the second side, with the second side overlapping; and a straight portion that extends straight from the folded portion, at the other end of the airbag cushion, with the second side overlapping the folded portion.

Further, still yet another exemplary embodiment of the present invention provides a curtain airbag cushion that includes: a folded portion that comprises a first folded portion formed by folding one end of an airbag cushion having a first side and a second side opposite to the first side, with the first side overlapping, and a second folded portion with the second side overlapping which is formed by folding one end of the first folded portion toward the second side, and that is formed by folding one end of the second folded portion toward the first side, with the second side overlapping; and a straight portion that extends straight from the folded portion, at the other end of the airbag cushion, with the second side overlapping the folded portion.

The details of other exemplary embodiments are included in the detailed description and the drawings.

According to the exemplary embodiments of the present invention, since the folded portion is unfolded like a book is opened, frictional resistance is reduced in development and the pressure for developing inside the vehicle is correspondingly improved, such that the development speed is also improved.

The effects of the present invention are not limited to the effects described above, and the other effects not stated in the above will be clearly understood by those skilled in the art from the following description.

DETAILED DESCRIPTION OF THE EMBODIMENTS

Figure 1:
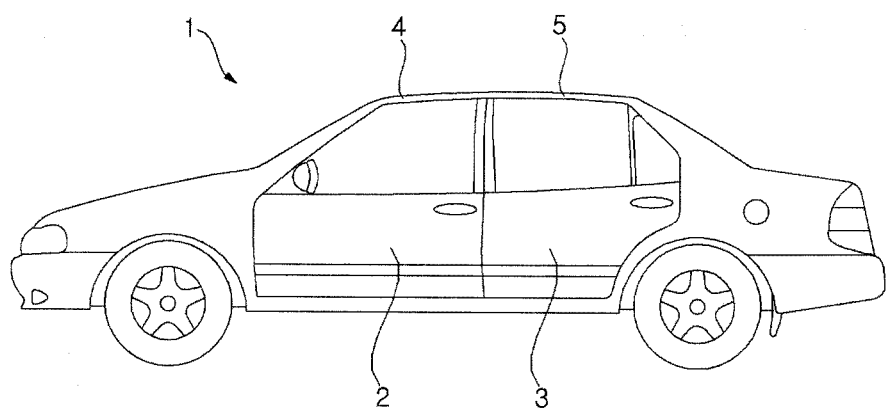
FIG. 1 is a side view showing a vehicle equipped with a curtain airbag cushion according to a first exemplary embodiment of the present invention.

Advantages and features of the present invention and methods for achieving them will be made clear from exemplary embodiments described below in detail with reference to the accompanying drawings. However, the present invention is not limited to exemplary embodiments described herein and will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals designate like components throughout the specification.

Curtain airbag cushions according to an exemplary embodiments of the present invention are described hereafter with reference to the accompanying drawings.

Figure 2:
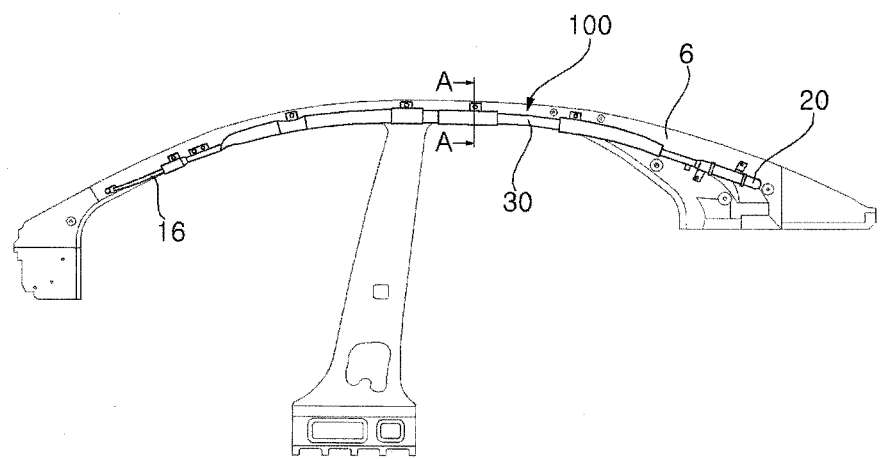
FIG. 2 is a side view showing when the curtain airbag cushion according to the first exemplary embodiment of the present invention is mounted in a vehicle.
Figure 3:
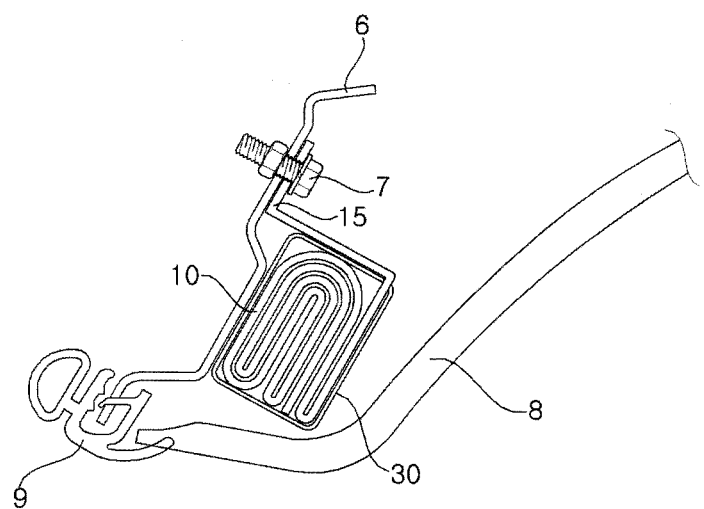
FIG. 3 is a cross-sectional view taken along the line A-A of FIG. 2.

FIG. 1 is a side view showing a vehicle equipped with a curtain airbag cushion according to a first exemplary embodiment of the present invention, FIG. 2 is a view showing when the curtain airbag cushion according to the first exemplary embodiment of the present invention is mounted in a vehicle, and FIG. 3 is a cross-sectional view taken along the line A-A of FIG. 2.

Referring to FIGS. 1 to 3, a curtain airbag system 100 including a curtain airbag cushion 100 according to the first exemplary embodiment of the present invention is mounted long in the longitudinal direction in the roof of a vehicle 1.

The vehicle 1 is provided with front doors 2 and rear doors 3 for passengers to get in/out of the vehicle (the passengers means all of the driver and passengers, and hereafter, is referred to as a passenger for the convenience of description). An A-pillar 4 is disposed above the front doors 2 and a C-pillar 5 is disposed above the rear doors 3.

The curtain airbag system 100 is mounted long in the longitudinal direction to a side inner panel 6 disposed inside the A-pillar 4 and the C-pillar 5.

The curtain airbag system 100 includes an inflator 20 generating gas and the airbag cushion 10 connected with the inflator 20 and developed and inflated by the gas flowing thereinto from the inflator 20 to protect the passenger's head.

The airbag cushion 10 is folded and sealed in a cushion cover 30, and then mounted to the side inner panel 6 in the A-pillar 4 and the C-pillar 5 by a fastener 7.

The curtain airbag system 100 is covered with a head liner 8 and not shown in the vehicle. The headliner 8 is the member that is made of fiber to cover the roof panel (not shown) of the vehicle 1 not to be exposed in the vehicle. The head liner 8 is locked to a weather strip 9 at the lower end of the side inner panel 6 and separated from the weather strip 9 when the airbag cushion 10 inflates, in which the airbag cushion 10 comes out and inflates through the gap between the weather strip 9 and the head liner 8 to be positioned between the passenger' head and the front door 2 and the rear door 3 to protect the passenger's head.

Figure 4:
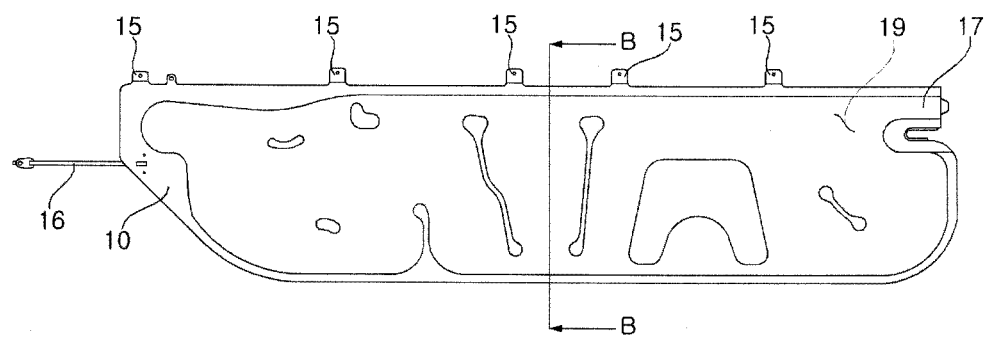
FIG. 4 is a side view showing when the curtain airbag cushion according to the first exemplary embodiment of the present invention has been unfolded.
Figure 5:
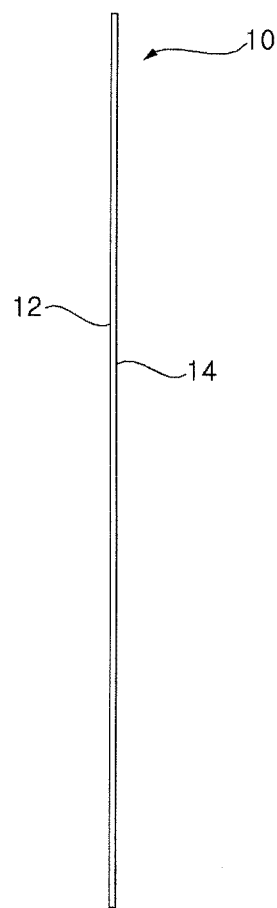
FIG. 5 is a cross-sectional view taken along the line B-B of FIG. 4.

FIG. 4 is a side view when the curtain airbag cushion 10 according to the first exemplary embodiment of the present invention has been unfolded and FIG. 5 is a cross-sectional view taken along the line B-B of FIG. 4.

Referring to FIGS. 4 and 5, a plurality of mounting taps 15 for mounting the side inner panel 6 is formed at the top of the airbag cushion 10. The mounting taps 15 are fastened to the side inner panel 6 by the fastener 7 shown in FIG. 3.

Further, an inflator connector 17 that is connected with the inflator 20 is formed at the rear upper portion of the airbag cushion 10. The airbag cushion 10 is developed and inflated by the gas generated by the inflator 20 and flowing into a chamber 19 of the airbag cushion 10.

An A-pillar tether 16 that is fixed to the side inner panel inside the A-pillar 4 is connected to the front of the airbag cushion 10. Therefore, the airbag cushion 10 inflates with the front restricted by the A-pillar tether 16, such that it can be developed without inclining backward.

The airbag cushion 10 includes a first side 12 and a second side 14 at the opposite side to the first side 12. The first side 12 and the second side 14 are kept flat at the opposite sides, before the gas flows in the chamber 19. The first side 12 faces the passenger and the second side 14 faces the outside of the vehicle 14.

The airbag cushion 10 should be developed inside the vehicle toward the passenger, not the outside of the vehicle 1, in order to protect the passenger's head.

The curtain airbag cushion 10 according to the first exemplary embodiment of the present invention has been folded such that the pressure for developing inside the vehicle can be improved, and it is inflated and developed inside the vehicle by the gas flowing thereinto from the inflator 20 to protect the passenger's head.

The shape of the folded airbag cushion 10 is described below.

Figure 6:
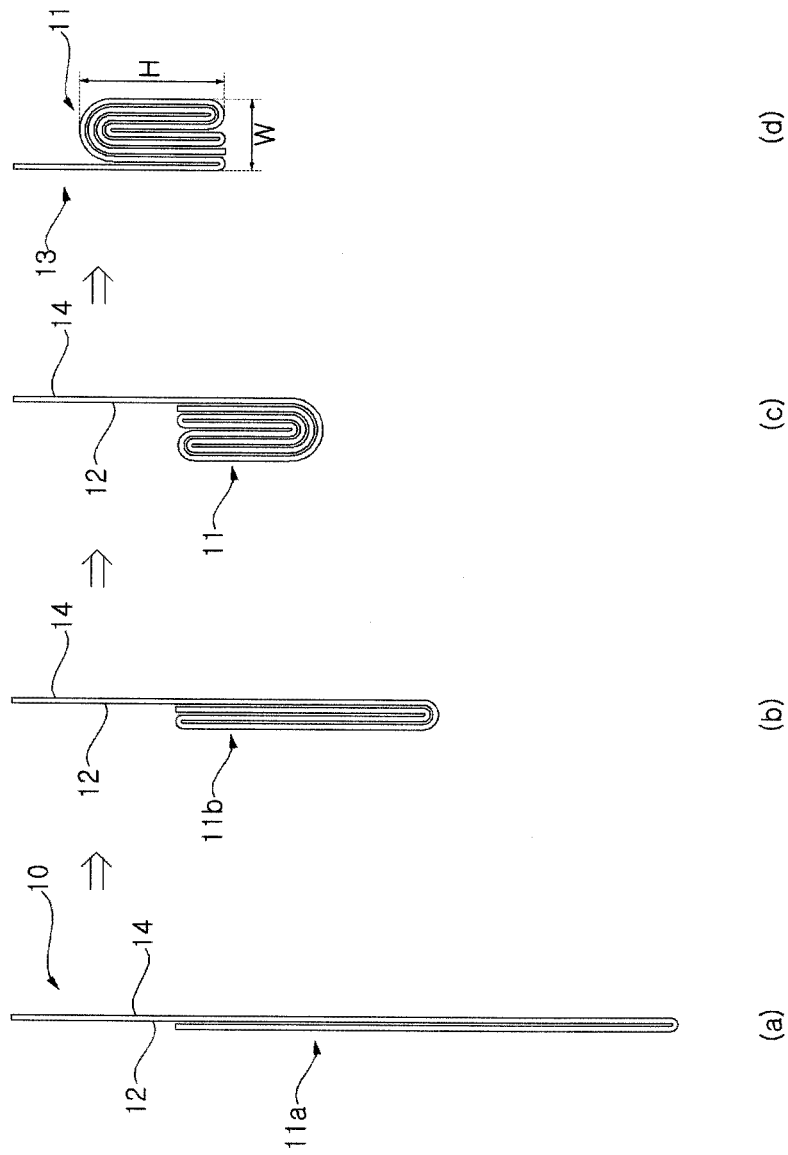
FIG. 6 is a side view showing the order of folding the curtain airbag cushion according to the first exemplary embodiment of the present invention.

FIG. 6 is a side view showing the order of folding a curtain airbag cushion 10 according to the first exemplary embodiment of the present invention.

Referring to FIG. 6, the airbag cushion 10 is composed of a folded portion 11 and a straight portion 13, when being folded, as shown in FIG. 6D. When dividing in the up-down direction the airbag cushion 10 unfolded flat, the folded portion 11 is formed at the lower portion of the airbag cushion 10 and the straight portion 13 extends from the folded portion 11, at the upper portion of the airbag cushion 10. In this configuration, the folded portion 11 is formed by folding at about $4/5$ of the up-down length of the airbag cushion 10 and the strait portion 13 is at about $1/5$ of the up-down length of the airbag cushion 10. In the first exemplary embodiment, the up-down length of the airbag cushion 10 is 504 mm, in which the length of the folded portion 11 is $4/5$ of 504 mm, 389 mm, which is folded, and the straight portion 13 is the other, 115 mm. Further, the height H of the folded portion 11 is 40 mm and the width W defined by the folded portion 11 and the straight portion 13 is 20 mm, when the airbag cushion 10 is folded.

A process of forming the folded portion 11 and the straight portion 13 is described. As shown in FIG. 6A, the lower end of the airbag cushion 10 is folded onto the first side 12, to the lower end of the straight portion 13. In this position, a first folded portion 11a is formed with the first side 12 overlapping.

Thereafter, as shown in FIG. 6B, a second folded portion 11b is formed by folding the lower end of the first folded portion 11a onto the first side 12, with the second side 14 overlapping. In the first exemplary embodiment, the second folded portion 11b is formed by folding the lower end of the first folded portion 11a to the upper end of the first folded portion 11a.

Thereafter, as shown in FIG. 6C, the folded portion 11 is completed by folding the lower end of the second folded portion 11b onto the first side 12, with the second side 14 overlapping. The folded portion 11 is formed by folding the lower end of the second folded portion 11b to the upper end of the second folded portion 11b in the first exemplary embodiment.

Thereafter, as shown in FIG. 6D, the process of folding the airbag cushion 10 is finished, with the second side 14 of the straight portion 13 overlapping the folded portion 11. In the first exemplary embodiment, the straight portion 13 is positioned to overlap the folded portion 11 by folding the lower end of the folded portion 11 at 180° toward the second side 14 of the straight portion 13.

Thereafter, the folded airbag cushion 10 folded as described above is sealed in the cushion cover 30 such that it is not unfolded, as shown in FIG. 3, and then the mounting taps 15 are fastened to the side inner panel 6 by the fastener 7.

As described above, the airbag cushion 10 folded and mounted to the side inner panel 6 unfolds like a book while being inflated with the gas generated by the inflator 20 and flowing into the chamber 19 in an accident of the vehicle 1, such that friction resistance of the airbag cushion 10 develouping is reduced and the pressure for developing inside the vehicle is increased, and accordingly, it is developed inside the vehicle, not outside the vehicle 1, thereby protecting the passenger's head. Further, due to the reduction of frictional resistance, the development speed of the airbag cushion 10 increases, such that it is possible to rapidly protect the passenger. That is, since the airbag cushion 10 has been folded by rolling the lower end to the upper end and the first side 12 is in continuous contact with the second side 14 in the airbag cushion 10 folded by this rolling method in the related art, large frictional resistance is generated between the first side 12 and the second side 14 when the airbag cushion 10 is unfolded, such that the development pressure and speed of the airbag cushion 10 are reduced by the frictional resistance. However, the airbag cushion 10 folded in accordance with the first exemplary embodiment can remove this problem.

Hereafter, the unfolding process of the airbag cushion 10 according to the first exemplary embodiment of the present invention is described. The unfolding process of the airbag cushion 10 is made in the reverse order of the folding process. That is, it is unfolded in the order from FIG. 6D to FIG. 6A in the fully unfolded shape shown in FIG. 5.

First, as shown in FIG. 6D, with the airbag cushion 10 mounted in the vehicle 1, when a vehicle accident occurs, the inflator 20 generates a gas, the straight portion 13 of the airbag cushion 10 is inflated by the gas flowing into the straight portion 13, and then the gas flows into the folded portion 11. The folded portion 11 overlapping the second side 14 of the straight portion 13 is unfolded, as shown in FIG. 6C, while moving away from the second side 14 of the straight portion 13, like a book is opened.

Thereafter, as the folded portion 11 inflates, the lower end of the second folded portion 11b moves away from the upper end of the second folded portion 11b, as if a book is opened, and it is unfolded as shown in FIG. 6B.

Thereafter, as the second folded portion 11b inflates, the lower end of the first folded portion 11a moves away from the upper end of the first folded portion 11a, as if a book is opened, and it is unfolded as shown in FIG. 6A.

Thereafter, as the first folded portion 11a inflates, the lower end of the airbag cushion 10 moves away from the first side of the airbag cushion 10, as if a book is opened, such that the airbag cushion 10 is completely unfolded, as shown in FIG. 5.

As described above, since the airbag cushion 10 folded according to the first exemplary embodiment of the present invention is developed while being unfolded, as if a book is opened, the frictional resistance is reduced, as compared with the airbag cushion 10 that has been folded with the first side 12 and the second side 14 are in continuous contact by the rolling method in the related art, such that the pressure for developing inside is increased and accordingly, the airbag cushion 10 can be developed inside the vehicle 1, not toward the outside. Further, the development speed of the airbag cushion 10 can be increased with the reduction of frictional resistance.

Figure 7:
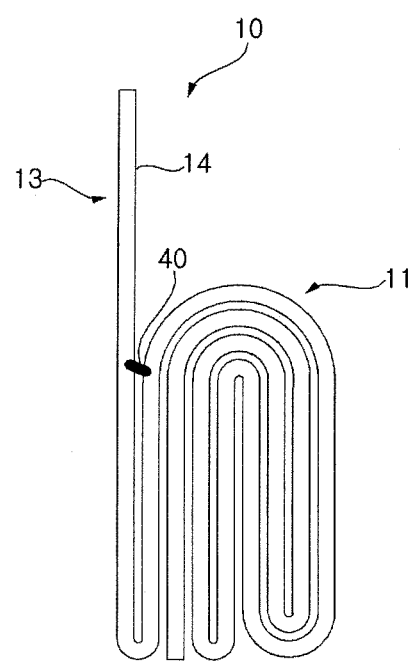
FIG. 7 is a side view showing when a curtain airbag cushion according to a second exemplary embodiment of the present invention has been folded.

FIG. 7 is a side view showing when a curtain airbag cushion 10 according to a second exemplary embodiment of the present invention has been folded. In the second exemplary embodiment, the same components as those of the first exemplary embodiment are given the same reference numerals and not described in detail, but only differences are described.

Referring to FIG. 7, it can be seen that the curtain airbag cushion 10 according to the second exemplary embodiment is different from the first exemplary embodiment described above.

That is, a tether 40 is connected to the portion at the joint of the folded portion 11 and the straight portion 13. In this configuration, the tether 40 has one end connected to the second side 14 of the straight portion 13 and the other end connected to the outer side of the folded portion 11.

The tether 40 is made of a flexible material, and of which one end may be sewn to the second side 14 of the straight portion 13 and the other end may be sewn to the outer side of the folded portion 11.

The tether 40 is formed to be able to be cut when the folded portion 11 is separated from the second side 14 of the straight portion 13. In this configuration, cutting the tether 40 when the folded portion 11 is separated from the second side 14 of the straight portion 13 is implemented by sewing the tether 40 to the second side 14 and the outer side of the folded portion 11 with a thread that can be cut by the force generated when the folded portion 11 is separated from the second side 14 of the straight portion 13. Obviously, it may be possible to form small holes in the tether in the perpendicular direction to the direction when the folded portion 11 is separated from the second side 14 of the straight portion 13 such that the tether 40 can be cut by the small hole by the force generated when the folded portion 11 is separated from the second side 14 of the straight portion 13.

The tether 40 restrains the folded portion 11 when the folded portion 11 is separated from the second side 14 of the straight portion 13. Therefore, the airbag cushion 10 is prevented from being overly developed inside the vehicle, such that it is possible to prevent the airbag cushion 10 from overly developing inside the vehicle and hitting the passenger's head.

It is preferable to connect the tether 40 to the portion of the airbag cushion 10 which may be excessively developed inside the vehicle. That is, the tether 40 may be partially connected to the second side 14 in the front-rear direction of the airbag cushion 10 such that the airbag cushion 10 is not overly developed inside the vehicle.

Figure 8:
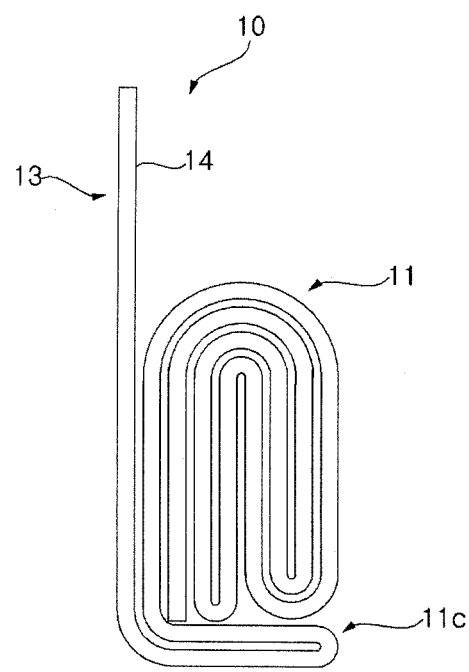
FIG. 8 is a side view showing when a curtain airbag cushion according to a third exemplary embodiment of the present invention has been folded.

FIG. 8 is a view showing when a curtain airbag cushion 10 according to a third exemplary embodiment of the present invention has been folded. In the third exemplary embodiment, the same components as those of the first exemplary embodiment are given the same reference numerals and not described in detail, but only differences are described.

Referring to FIG. 8, it can be seen that the curtain airbag cushion 10 according to the third exemplary embodiment is different from the first exemplary embodiment described above.

That is, although the straight portion 13 and the folded portion 11 are directly connected in the first exemplary embodiment described above, a third folded portion 11c connecting the straight portion 13 with the folded portion 11 is further formed in the third exemplary embodiment.

The third folded portion 11c is formed with the second side 14 overlapping, and bends at 90° from the straight portion 13 in contact with the folded portion 11.

In this configuration, similar to the first exemplary embodiment, the third folded portion 11c can be formed by forming the folded portion 11 at about ⅘ portion of the entire up-down length of the airbag cushion 10, and forming the straight portion 13 shorter than the first exemplary embodiment described above. Obviously, the third folded portion 11c may be formed by making the straight portion 13 about ⅕ of the up-down length of the airbag cushion 10 and making the folded portion 11 shorter than the first exemplary embodiment described above (e.g. by folding ⅗ of the airbag cushion 10), similar to the first exemplary embodiment described above.

The width of the third folded portion 11c is the same as the width defined by the folded portion 11 and the straight portion 13, and the third folded portion supports the entire lower end of the folded portion 11 in the figure.

As described above, when the third folded portion 11c is further formed, two portions are added to the unfolding portion of the airbag cushion 10, as compared with the first exemplary embodiment described above, such that the frictional resistance when the airbag cushion is unfolded increases, as compared with the first exemplary embodiment described above, which prevents the airbag cushion 10 from overly developing inside the vehicle. That is, in the airbag cushion 10 according to the third exemplary embodiment, the third folded portion 11c formed with the second side 14 overlapping, the folded portion 11 is then unfolded from the third folded portion 11c, and then the other is unfolded in the same order as in the first exemplary embodiment described above, such that as compared with the first exemplary embodiment, the frictional resistance when the airbag cushion 10 is unfolded increases and accordingly it is possible to prevent the airbag cushion 10 from overly developing inside the vehicle.

Figure 9:
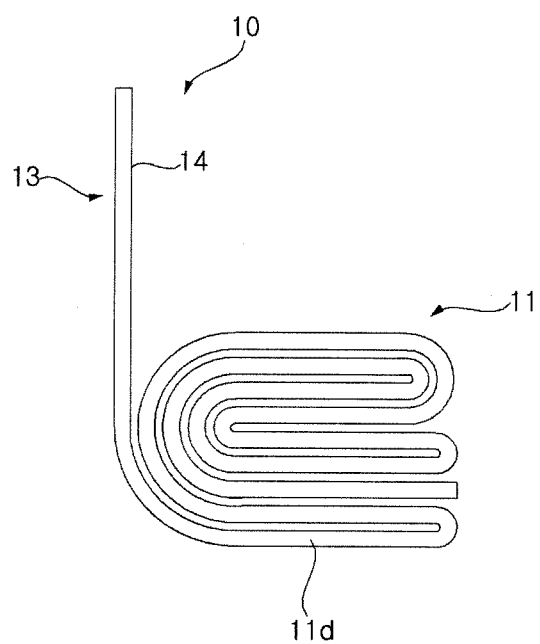
FIG. 9 is a side view showing when a curtain airbag cushion according to a fourth exemplary embodiment of the present invention has been folded.

FIG. 9 is a side view showing when a curtain airbag cushion 10 according to a fourth exemplary embodiment of the present invention has been folded. In the fourth exemplary embodiment, the same components as those of the first exemplary embodiment are given the same reference numerals and not described in detail, but only differences are described.

Referring to FIG. 9, it can be seen that the curtain airbag cushion 10 according to the fourth exemplary embodiment is different from the first exemplary embodiment described above.

That is, although the straight portion 13 and the folded portion 11 are directly connected in the first exemplary embodiment described above, an extender 11d connecting the straight portion 13 with the folded portion 11 is further formed.

The extender 11d bends at 90° from the straight portion 13, with the second side 14 overlapping the folded portion 11.

The straight portion 13 overlaps the folded portion 11 by folding one end of the folded portion 11 at 270° toward the second side 14 while the second side 14 of the extender 11d overlaps the folded portion 11.

In this configuration, the extender 11d can be formed by forming the folded portion 11 by folding about ⅘ of the entire up-down length of the airbag cushion 10 and making the straight portion 13 shorter than the first exemplary embodiment, similar to the first exemplary embodiment. Obviously, the extender 11d may be formed by making the straight portion 13 about ⅕ of the up-down length of the airbag cushion 10 and making the folded portion 11 shorter than the first exemplary embodiment described above (e.g. by folding ⅗ of the airbag cushion 10), similar to the first exemplary embodiment described above.

As described above, when the extender 11d is further formed, one portion is added to the unfolding portion of the airbag cushion 10, as compared with the first exemplary embodiment described above, such that the frictional resistance when the airbag cushion is unfolded increases, as compared with the first exemplary embodiment described above, which prevents the airbag cushion 10 from overly developing inside the vehicle. That is, in the airbag cushion 10 according to the fourth exemplary embodiment, the folded portion 11 is unfolded from the second side 14 of the extender 11d, and then the other is unfolded in the same order as in the first exemplary embodiment described above, such that as compared with the first exemplary embodiment, the frictional resistance when the airbag cushion is unfolded increases and accordingly it is possible to prevent the airbag cushion 10 from overly developing inside the vehicle.

Figure 10:
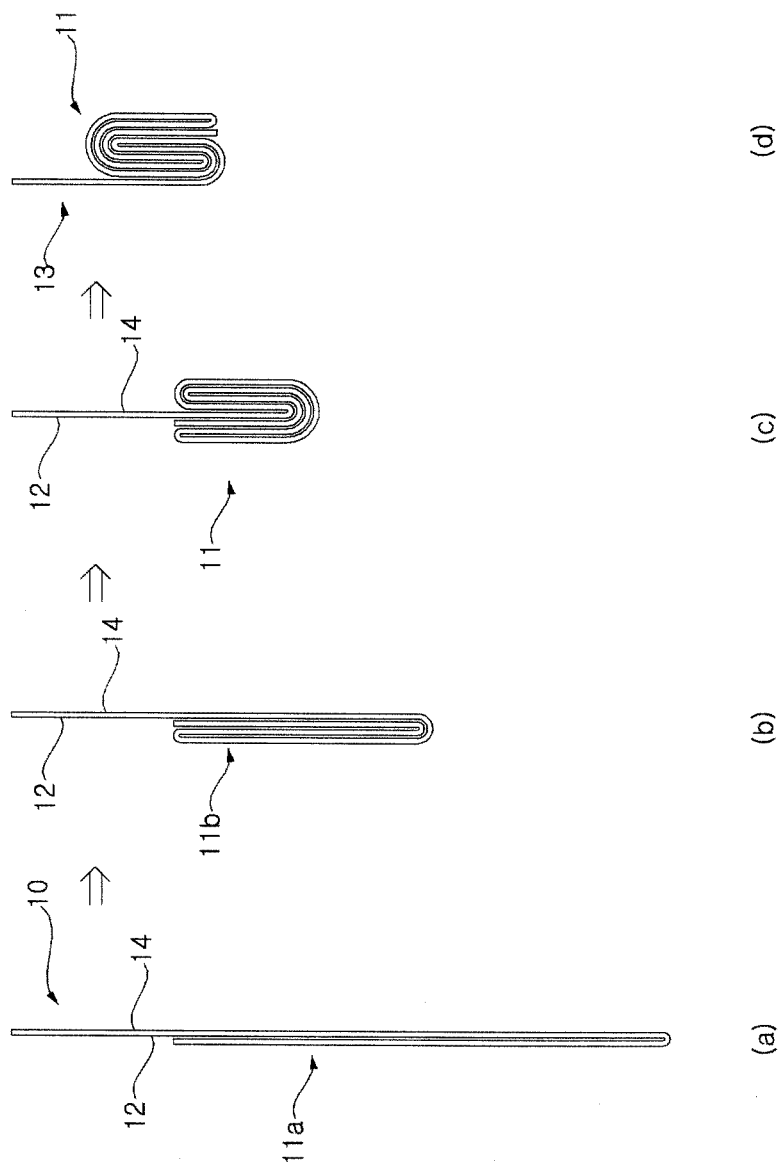
FIG. 10 is a side view showing the order of folding a curtain airbag cushion according to a fifth exemplary embodiment of the present invention.

FIG. 10 is a side view showing the order of folding a curtain airbag cushion 10 according to a fifth exemplary embodiment of the present invention. In the fifth exemplary embodiment, the same components as those of the first exemplary embodiment are given the same reference numerals and not described in detail, but only differences are described.

Referring to FIG. 10, it can be seen that the curtain airbag cushion 10 according to the fifth exemplary embodiment is different from the first exemplary embodiment described above.

That is, forming the first folded portion 11a as shown in FIG. 10A and forming the second folded portion 11b as shown in FIG. 10B are the same as the first exemplary embodiment.

However, forming the folded portion 10 as shown in FIG. 10C is different from the first exemplary embodiment. That is, the folded portion 11 with the second side 14 overlapping is formed by folding the lower end of the second folded portion 11b toward the first side 12 in the first exemplary embodiment described above; however, the folded portion 11 with the second side 14 overlapping is formed by folding the lower end of the second folded portion 11b toward the second side 14 in the fifth exemplary embodiment.

Thereafter, as shown in FIG. 10D, the process of folding the airbag cushion 10 is finished, with the second side 14 of the straight portion 13 overlapping the folded portion 11. In the fifth exemplary embodiment, the straight portion 13 is positioned to overlap the folded portion 11 by folding the lower end of the folded portion 11 at 180° toward the second side 14 of the straight portion 13.

As described above, when the folded portion with the second side 14 overlapping is formed by folding the lower end of the second folded portion 11b toward the second side 14, the development direction of the airbag cushion 10 is different from that in the first exemplary embodiment described above, such that it is possible to prevent the airbag cushion 10 from excessively developing inside the vehicle. That is, the folded portion 11 in the positions shown in FIG. 6D is unfolded from the straight portion 13 into the position shown in FIG. 6C and then the lower end of the second folded portion 11b is unfolded from the upper end of the second folded portion 11b into the position shown in FIG. 6B in the first exemplary embodiment described above; however, the folded portion 11 in the position shown in FIG. 10D is unfolded from the straight portion 13 into the position shown in FIG. 10C and then the lower end of the second folded portion 11b is unfolded from the upper end of the second folded portion 11b in the opposite direction to the first exemplary embodiment into the position shown in FIG. 10B in the airbag cushion 10 according to the fifth exemplary embodiment, such that it is possible to prevent the airbag cushion 10 from overly developing inside the vehicle.

Figure 11:
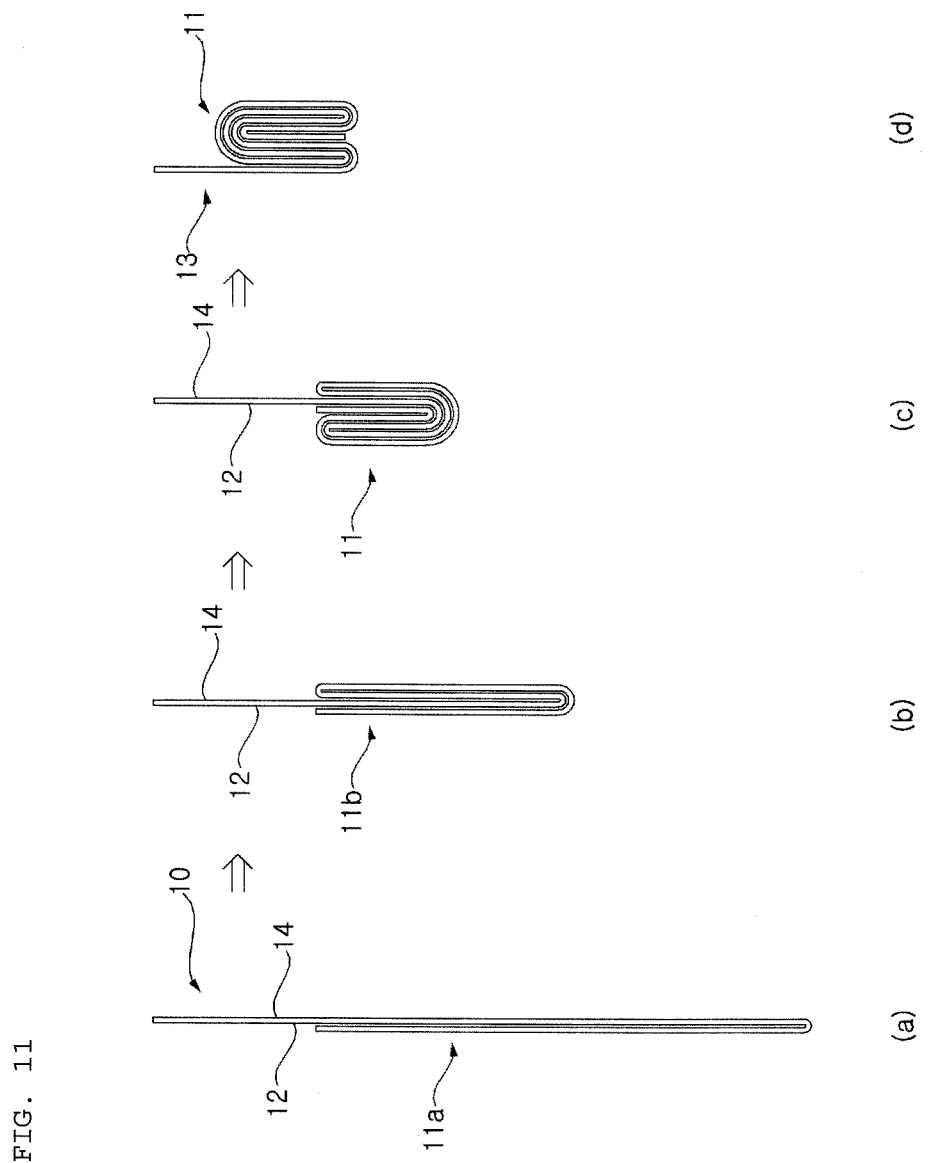
FIG. 11 is a view showing the order of folding a curtain airbag cushion according to a sixth exemplary embodiment of the present invention.

FIG. 11 is a side view showing the order of folding a curtain airbag cushion 10 according to a sixth exemplary embodiment of the present invention. In the sixth exemplary embodiment, the same components as those of the first exemplary embodiment are given the same reference numerals and not described in detail, but only differences are described.

Referring to FIG. 11, it can be seen that the curtain airbag cushion 10 according to the sixth exemplary embodiment is different from the first exemplary embodiment described above.

That is, forming the first folded portion 11a as shown in FIG. 11A is the same as in the first exemplary embodiment.

However, forming the second folded portion 11b as shown in FIG. 11B is different from the first exemplary embodiment.

That is, the second folded portion 11b with the second side 14 overlapping is formed by folding the lower end of the first folded portion 11a toward the first side 12 in the first exemplary embodiment described above; however, the second folded portion 11b with the second side 14 overlapping is formed by folding the lower end of the first folded portion 11a toward the second side 14 in the sixth exemplary embodiment.

Thereafter, as shown in FIG. 11C, the folded portion 11 is completed by folding the lower end of the second folded portion 11b onto the first side 12, with the second side 14 overlapping.

Thereafter, as shown in FIG. 11D, the process of folding the airbag cushion 10 is finished, with the second side 14 of the straight portion 13 overlapping the folded portion 11. In the sixth exemplary embodiment, the straight portion 13 is positioned to overlap the folded portion 11 by folding the lower end of the folded portion 11 at 180° toward the second side 14 of the straight portion 13.

As described above, when the second folded portion 11b with the second side 14 overlapping is formed by folding the lower end of the first folded portion 11a toward the second side 14, the development direction of the airbag cushion 10 is different from that in the first exemplary embodiment described above, such that it is possible to prevent the airbag cushion 10 from overly developing inside the vehicle. That is, the folded portion 11 in the position shown in FIG. 6D is unfolded from the straight portion 13 into the position shown in FIG. 6C and then the lower end of the second folded portion 11b is unfolded from the upper end of the second folded portion 11b in the position shown in FIG. 6B while the lower end of the folded portion 11a is unfolded from the upper end of the first folded portion 11a into the position shown in FIG. 6A in the first exemplary embodiment; however, the unfolded portion 11 in the position shown in FIG. 11D is unfolded from the straight portion 13 into the position shown in FIG. 11C and then the lower end of the second folded portion 11b is unfolded from the upper end of the second folded portion 11b into the position shown in FIG. 11B while the lower end of the first folded portion 11a is unfolded from the upper end of the first folded portion 11a in the opposite direction to the first exemplary embodiment described above in the position shown in FIG. 11A, in the airbag cushion 10 according to the sixth exemplary embodiment, such that it is possible to prevent the airbag cushion 10 from excessively developing inside the vehicle.

Since the folded portions 11 of the curtain airbag cushions 10 according to the exemplary embodiments of the present invention which are folded as described above are unfolded like a book is opened, the frictional resistance is small and the pressure for developing inside the vehicle increases and the development speed correspondingly increases.

It will be understood to those skilled in the art that the present invention may be implemented in various ways without changing the spirit of necessary features of the present invention. Accordingly, the embodiments described above are provided as examples in the whole respects and do not limit the present invention. The scope of the present invention is defined in the following claims and all changed or modified types derived from the meanings and scope of the claims and the equivalent concept thereof should be construed as being included in the scope of the present invention.

What is claimed is:

1. A curtain airbag cushion comprising:
   a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side or the second side, and that is formed by folding one end of the second folded portion toward the first side or the second side, with the second side overlapping; and a straight portion that extends straight from the folded portion, at the other end of the airbag cushion, with the second side overlapping the folded portion, wherein the second folded portion is formed by folding one end of the first folded portion to the other end of the first folded portion.

2. The curtain airbag cushion according to claim 1, further comprising a third folded portion formed with the second side overlapping, and connecting the folded portion with the straight portion.

3. The curtain airbag cushion according to claim 2, wherein the third folded portion bends at 90° from the straight portion to overlap the folded portion.

4. The curtain airbag cushion according to claim 2, wherein the width of the third folded portion is the same as the width defined by the folded portion and the straight portion.

5. The curtain airbag cushion according to claim 1, wherein the first side of the airbag cushion faces a passenger.

6. The curtain airbag cushion according to claim 1, wherein one end of the folded portion is folded at 180° toward the second side such that the straight portion overlaps the folded portion.

7. A curtain airbag cushion comprising:
a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side or the second side, and that is formed by folding one end of the second folded portion toward the first side or the second side, with the second side overlapping;

a straight portion that extends straight from the folded portion, at the other end of the airbag cushion, with the second side overlapping the folded portion; and a tether connecting joint of the folded portion and the straight portion.

8. A curtain airbag cushion comprising:
a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side or the second side, and that is formed by folding one end of the second folded portion toward the first side or the second side, with the second side overlapping: and a straight portion that extends straight from the folded portion, at the other end of the airbag cushion, with the second side overlapping the folded portion, wherein the folded portion is formed by folding one end of the second folded portion to the other end of the second folded portion.

9. A curtain airbag cushion comprising:
a folded portion that comprises a first folded portion formed by folding one end of an airbag cushion having first side and a second side opposite to the first side, with the first side overlapping, and a second folded portion with the second side overlapping which is formed by folding one end of the first folded portion toward the first side or the second side, and that is formed by folding one end of the second folded portion toward the first side or the second side, with the second side overlapping; and a straight portion that extends straight from the folded portion, the other end of the airbag cushion, with the second side overlapping the folded portion, wherein the folded portion is formed by folding about ⅘ of the up-down length of the airbag cushion.

10. A curtain airbag cushion comprising:
a folded portion that comprises a first folded portion formed by folding one end of an airbag cushion having a first side and a second side opposite to the first side, with the first side overlapping, and a second folded portion with the second side overlapping which is formed by folding one end of the first folded portion toward the first side, and that is formed with the second side overlapping by folding one end of the second folded portion toward the first side;

a straight portion that is formed straight at the other end of the airbag cushion, with the second side overlapping the folded portion; and an extender that connects the folded portion with the straight portion, with the second side overlapping the folded portion, wherein the second folded portion is formed by folding one end of the first folded portion to the other end of the first folded portion.

11. The curtain airbag cushion according to claim 10, wherein the first side of the airbag cushion faces a passenger.

12. The curtain airbag cushion according to claim 10, wherein the folded portion is formed by folding one end of the second folded portion to the other end of the second folded portion.

13. The curtain airbag cushion according to claim 10, wherein one end of the folded portion is folded at 270° toward the second side such that the straight portion overlaps the folded portion, and the second side of the extender overlaps the folded portion.

* * * * *